US009543730B2

(12) United States Patent
Will

(10) Patent No.: US 9,543,730 B2
(45) Date of Patent: Jan. 10, 2017

(54) WIRE TRANSFER SYSTEM HAVING WIRE SINGULATING DEVICE

(71) Applicant: Tyco Electronics Corporation, Berwyn, PA (US)

(72) Inventor: Aaron Scott Will, Enola, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 73 days.

(21) Appl. No.: 14/570,277

(22) Filed: Dec. 15, 2014

(65) Prior Publication Data

US 2016/0172813 A1    Jun. 16, 2016

(51) Int. Cl.
| | | |
|---|---|---|
| B66C 1/00 | (2006.01) | |
| H01R 43/28 | (2006.01) | |
| B25J 11/00 | (2006.01) | |
| H01R 43/052 | (2006.01) | |

(52) U.S. Cl.
CPC ............... H01R 43/28 (2013.01); B25J 11/00 (2013.01); *H01R 43/052* (2013.01)

(58) Field of Classification Search
CPC ............. B66C 1/22; B66C 1/663; B66C 1/10; B66C 1/64; B66C 1/02; B66C 1/16; B66C 1/24; B66C 1/18; B66C 1/12; B66C 1/34; B66C 1/36; B65G 47/61; H01R 43/052; H01R 43/28; B25J 11/00
USPC ............. 294/81.56, 81.53, 81.3, 81.62, 81.6, 67.1,294/67.21, 74, 75, 82.1, 82.15, 82.17, 82.19,294/82.2–82.24
See application file for complete search history.

(56) References Cited

U.S. PATENT DOCUMENTS

| | | | | |
|---|---|---|---|---|
| 801,523 A | * | 10/1905 | Hinchman et al. | B65G 47/847 198/476.1 |
| 1,530,010 A | * | 3/1925 | Neilson | B66C 1/36 24/599.5 |
| 2,074,809 A | * | 3/1937 | Rose | B65G 47/61 198/468.6 |
| 2,796,974 A | * | 6/1957 | Weinberger | B65G 47/61 198/408 |
| 3,245,135 A | | 4/1966 | Netta et al. | |
| 3,782,772 A | * | 1/1974 | Cranston, III | B66C 1/34 294/81.56 |
| 4,156,961 A | | 6/1979 | Agoh | |
| 5,292,165 A | * | 3/1994 | Wiklund | B66C 1/36 294/82.2 |
| 5,899,512 A | * | 5/1999 | Wiklund | B66C 1/36 24/599.3 |

(Continued)

FOREIGN PATENT DOCUMENTS

GB    1 045 519 A    10/1966

OTHER PUBLICATIONS

European Search Report, Mail Date, May 4, 2016, EP 15 19 4016, Application No. 15194016.0-1801.

*Primary Examiner* — Stephen Vu

(57) ABSTRACT

A wire singulating device includes a carrier member and a retention feature. The carrier member has a front edge and an opposite rear edge. The front edge defines an opening to a slot that extends at least partially towards the rear edge. The carrier member is configured to move relative to a wire bundle that includes plural wires such that the front edge engages the wire bundle. The slot is configured to receive one wire of the wire bundle therein. The retention feature is coupled to the carrier member and juxtaposed relative to the slot to retain the wire within the slot as the carrier member moves away from the wire bundle to separate the wire from the wire bundle.

20 Claims, 5 Drawing Sheets

(56) References Cited

U.S. PATENT DOCUMENTS 7,255,381 B2 * 8/2007 Komizo .................... B66C 1/36
                                                         294/101

* cited by examiner

WIRE TRANSFER SYSTEM HAVING WIRE SINGULATING DEVICE

BACKGROUND OF THE INVENTION

The subject matter herein relates generally to wire transfer systems that have wire singulating devices for singulating wires from wire bundles.

Many electrical systems utilize electrical leads to electrically connect electrical components or devices. Electrical leads are typically produced by cutting a segment of wire, stripping one or both ends of the wire, and then crimping a terminal to one or both ends of the wire segment. Known lead-making operations have different levels of automation depending on cost and complexity of the machinery. For example, in a semi-automatic bench machine, a human operator presents wires one at a time to a terminator that crimps a terminal on the end of the wire. In another example, some lead-maker machines are fully automated such that wire is automatically pulled from large spools of wire, cut to length, and presented to a specific terminator to crimp the wire to a pre-selected terminal. Thus, the automatic lead-makers may control the wire throughout the operation from the supply spool to the production of the lead, culminating in delivery to a storage container.

Both types of machinery have recognized shortcomings. With the semi-automatic bench machine, for example, the operator has to pull each individual wire from a bundle of wires that may include hundreds of wires and present each wire to the terminator. The bench machine thus requires significant human intervention to separate or singulate wires from the wire bundle, which limits the efficiency and productivity of the lead-making operation and also requires the expense for operator's labor costs. The fully-automated lead-maker machines do not require the level of human intervention as the bench machines, but the lead-maker machines are typically much more complex and expensive than bench machines, so the cost may be prohibitive. In addition, it may be difficult and time-consuming to change wire sizes in the automatic lead-maker machines, as such changeover may require substitution of the large supply spool and other modifications to the system throughout the production line. A need remains for a wire singulating device that is more automated than known semi-automatic bench machines and is not as complex or expensive as fully-automated lead-maker machines.

BRIEF DESCRIPTION OF THE INVENTION

In one embodiment, a wire singulating device is provided that includes a carrier member and a retention feature. The carrier member has a front edge and an opposite rear edge. The front edge defines an opening to a slot that extends at least partially towards the rear edge. The carrier member is configured to move relative to a wire bundle that includes plural wires such that the front edge engages the wire bundle. The slot is configured to receive one wire of the wire bundle therein. The retention feature is coupled to the carrier member and juxtaposed relative to the slot to retain the wire within the slot as the carrier member moves away from the wire bundle to separate the wire from the wire bundle.

In another embodiment, a wire transfer system is provided that includes a wire singulating device and a transfer arm. The wire singulating device includes a carrier member. The carrier member has a first side and an opposite second side. The carrier member has a front edge and an opposite rear edge. The front edge defines an opening to a slot. The slot extends at least partially towards the rear edge. The slot extends through the carrier member between the first side and the second side. The slot is sized to receive one wire of a wire bundle that includes multiple wires. The transfer arm holds the wire singulating device. The transfer arm is configured to move the wire singulating device towards and away from the wire bundle. As the transfer arm moves toward the wire bundle, the carrier member engages the wire bundle and one of the wires is received in the slot. The wire is retained in the slot as the transfer arm moves away from the wire bundle to separate the wire from the wire bundle.

DETAILED DESCRIPTION OF THE INVENTION

Figure 1:
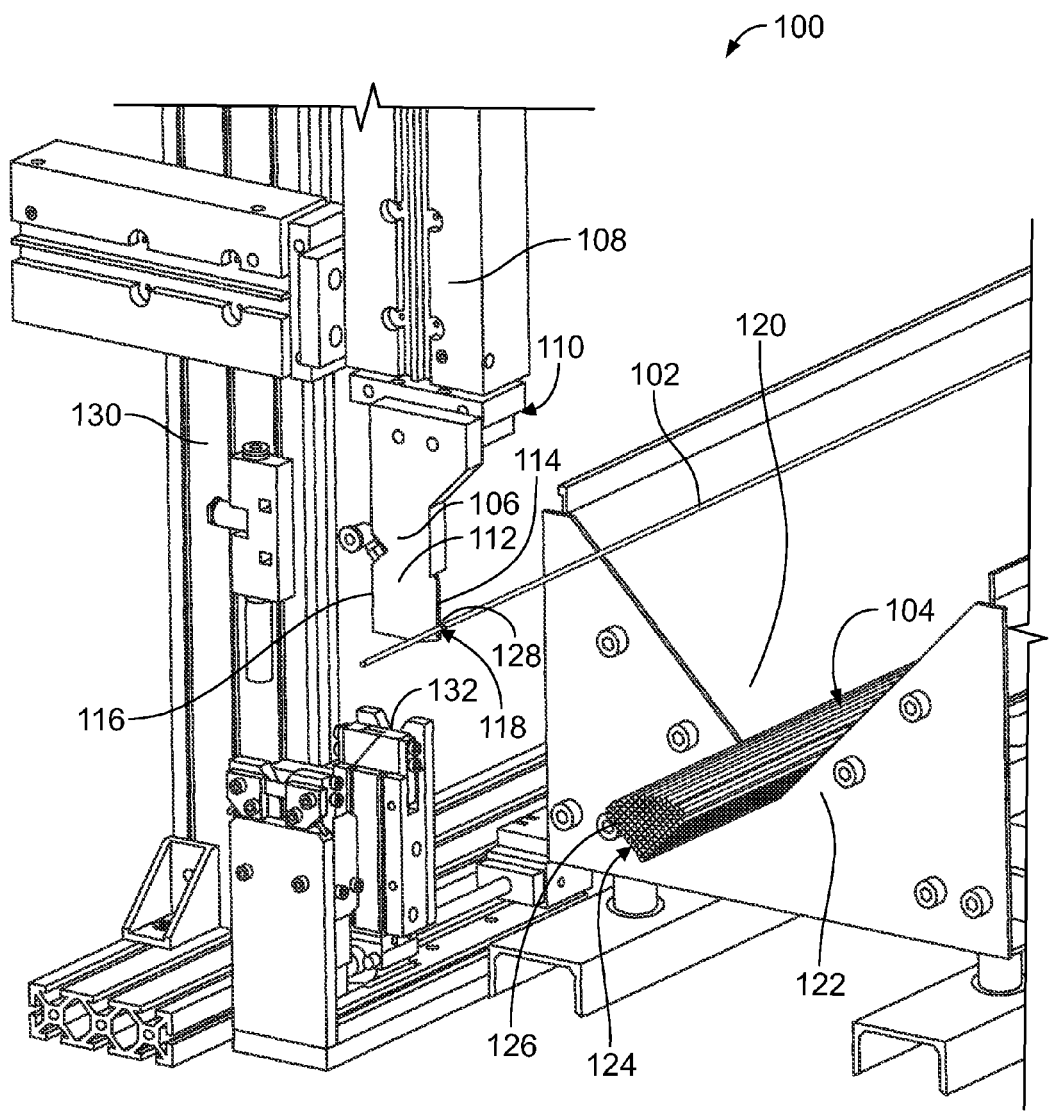
FIG. 1 is a perspective view of a wire transfer system in accordance with an exemplary embodiment.

FIG. 1 is a perspective view of a wire transfer system 100 in accordance with an exemplary embodiment. The wire transfer system 100 is configured to separate individual wires 102 from a wire bundle 104 that includes multiple wires 102. For example, the wire bundle 104 may include hundreds of wires 102 that extend generally parallel to each other. The wires 102 of the wire bundle 104 may be pre-cut into segments of identical length. The wire transfer system 100 is configured to automatically separate one of the wires 102 at a time for further processing, such as prepping the wire 102 for a crimping the wire 102 to a terminal (not shown).

The wire transfer system 100 includes a wire singulating device 106 and a transfer arm 108. The wire singulating device 106 is configured to engage one of the wires 102 of the wire bundle 104 at a time. The wire singulating device 106 is coupled to a distal end 110 of the transfer arm 108. The transfer arm 108 moves (for example, translates) the wire singulating device 106 towards and away from the wire bundle 104. For example, the transfer arm 108 moves the wire singulating device 106 towards the wire bundle 104 to collect one of the wires 102, and the transfer arm 108 thereafter moves the wire singulating device 106 away from the wire bundle 104 to separate (for example, singulate) the wire 102 from the other wires 102 in the wire bundle 104.

The transfer arm 108 is mounted to a stand 130. The transfer arm 108 may be configured to move in at least two dimensions, such as along a lateral axis and along a vertical axis. In the illustrated embodiment, the transfer arm 108 is disposed at an uppermost height and at a nearest horizontal or lateral position relative to the stand 130. In other embodiments, the transfer arm 108 may move in three dimensions.

The wire singulating device 106 includes a carrier member 112 that has a front edge 114 and an opposite rear edge 116. As used herein, relative or spatial terms such as "top," "bottom," "left," "right," "front," and "rear" are only used to distinguish the referenced elements and do not necessarily require particular positions or orientations in the wire transfer system 100 or in the surrounding environment of the wire transfer system 100. A slot 118 (shown in more detail in FIG. 3) is defined along the front edge 114 of the carrier member 112. The slot 118 extends at least partially towards the rear edge 116. The slot 118 is sized to receive one wire 102 of the wire bundle 104 therein. For example, the slot 118 may be sized to restrict receipt of more than one wire 102. As described further herein, the wire singulating device 106 may include multiple slots of different sizes or one slot that is adjustable to different sizes in order to accommodate wires of different diameters.

The wire bundle 104 may be located in a wedge-shaped bin 120. The wire bundle 104 extends beyond an end plate 122 of the bin 120, such that an end 124 of the wire bundle 104 is cantilevered from the bin 120. In an embodiment, the transfer arm 108 moves the wire singulating device 106 towards a cantilevered section of the wire bundle 104 that extends beyond the end plate 122. The transfer arm 108 may move the wire singulating device 106 towards the wire bundle 104 from the side such that the front edge 114 of the wire singulating device 106 engages a side 126 of the wire bundle 104. The front edge 114 applies a force on the wires 102 of the wire bundle 104, and one wire 102 is received in the slot 118 defined along the front edge 114.

Once the wire 102 is received in the slot 118, the wire 102 is retained in the slot 118 as the transfer arm 108 moves the wire singulating device 106 away from the wire bundle 104 to separate the wire 102 from the wire bundle 104. The wire 102 may be retained in the slot 118 by a size, shape, or orientation of the slot 118 and/or by a retention feature 128 of the wire singulating device 106. The retention feature 128 is coupled to the carrier member 112 and is juxtaposed relative to the slot 118. As used herein, "juxtaposed relative to" means located at least proximate to, including near, on, or in. As described further herein, the retention feature 128 may apply a biasing force on the wire 102 in the slot 118 and/or may block egress of the wire 102 out of the slot 118. The wire transfer system 100 is configured to deliver the wire 102 in the slot 118 to another device for processing or to a container for storage. For example, as shown in FIG. 1, the wire 102 is delivered to a wire gripping device 132. The wire gripping device 132 may be a set of grip jaws. The transfer arm 108 moves the wire singulating device 106 to the wire gripping device 132, and the wire singulating device 106 releases the wire 102 into the wire gripping device 132. Optionally, the wire gripping device 132 may be used to locate an end of the wire 102 for stripping the insulation off of the wire 102 at the end in preparation for a crimping operation or another terminating operation.

Figure 2:
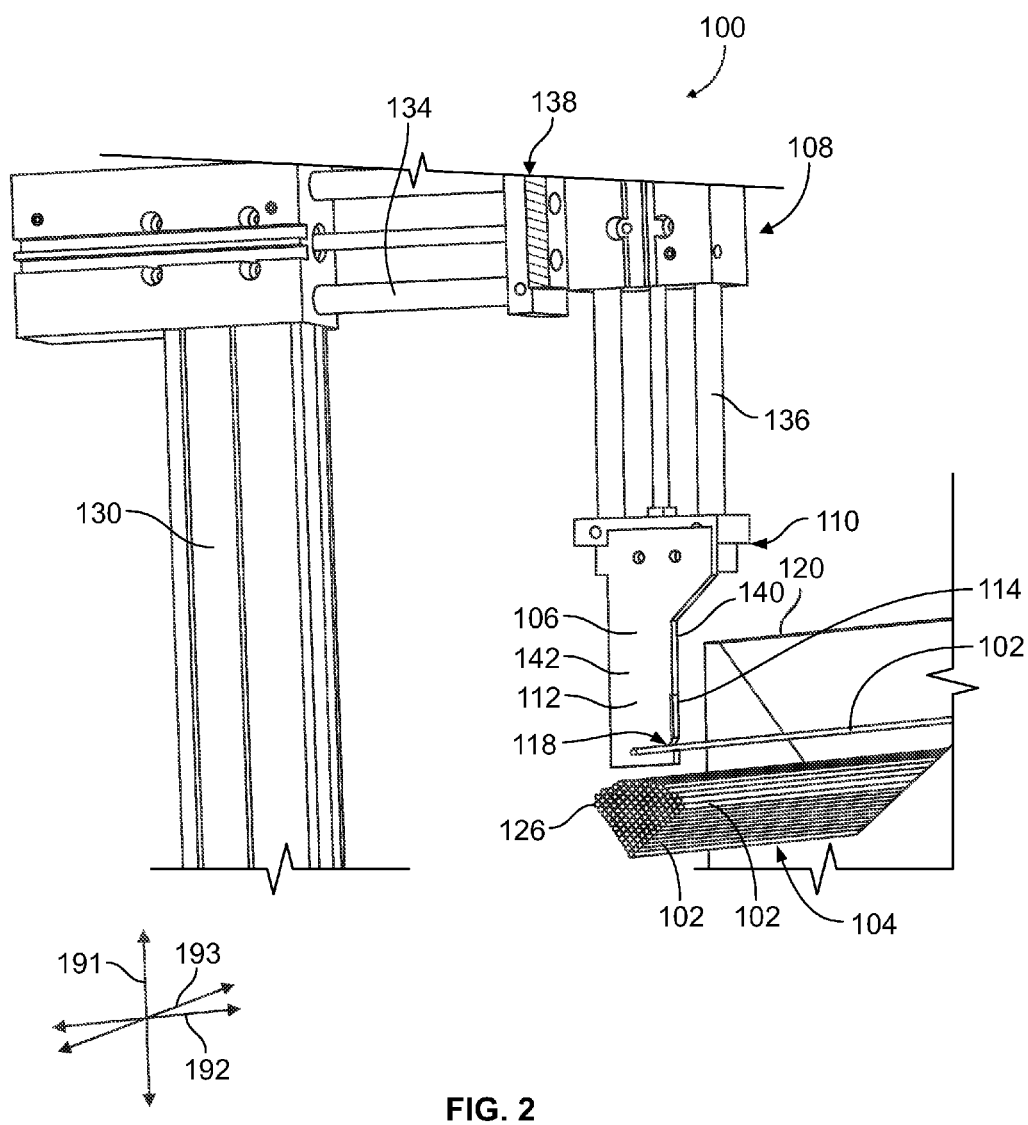
FIG. 2 is a perspective view of a portion of the wire transfer system according to an embodiment.

FIG. 2 is a perspective view of a portion of the wire transfer system 100 according to an embodiment. The wire transfer system 100 is oriented with respect to a Y or vertical axis 191, an X or lateral axis 192, and a Z or longitudinal axis 193. The axes 191-193 are mutually perpendicular. It is understood that the axes 191-193 are not required to have any particular orientation with respect to gravity. The wire singulating device 106 may be movable in two dimensions, such as along a vertical plane defined by the vertical and lateral axes 191, 192. Alternatively, the wire singulating device 106 may be movable in three dimensions.

The transfer arm 108 in the illustrated embodiment includes a first linear transfer member 134 and a second linear transfer member 136. The first linear transfer member 134 extends to various lengths along the lateral axis 192. The second linear transfer member 136 is coupled to a distal end 138 of the first linear transfer member 134. The second linear transfer member 136 extends to various lengths along the vertical axis 191. The wire singulating device 106 is fixed to the distal end 110 of the transfer arm 108, which is a distal end of the second linear transfer member 136. By controlling the first and second linear transfer members 134, 136, the wire singulating device 106 is movable along a plane defined by the vertical and lateral axes 191, 192. In an alternative embodiment, the transfer arm 108 may also be movable along the longitudinal axis 193. For example, the transfer arm 108 may include a third linear transfer member that is movable in the longitudinal axis 193. Alternatively, the transfer arm 108 may be rotatable or pivotable such that the transfer arm 108 is able to swing in a plane defined by the lateral and longitudinal axes 192, 193. Other types of systems may be used for the transfer arm 108 in other embodiments, such as a Cartesian motion robot with rotary axis, a selective compliance assembly robot arm (SCARA), or other robotic motion system.

The transfer arm 108 moves along a collection stroke and a delivery stroke. During the collection stroke the transfer arm 108 moves the wire singulating device 106 towards the wire bundle 104 to collect one of the wires 102 from the wire bundle 104. The deliver stroke follows the collection stroke. During the delivery stroke the transfer arm 108 moves the wire singulating device 106, with the collected wire 102 therein, away from the wire bundle 104 to separate the wire 102 from the other wires 102 in the wire bundle 104. At the end of the delivery stroke, the wire singulating device 106 releases the wire 102 to a wire processing device, a wire gripping device 132 (shown in FIG. 1), or a wire storage container. For example, the wire gripping device 132 may move towards the wire singulating device 106 to take the wire 102 at the end of the delivery stroke. The transfer arm 108 may be controlled by one or more motors (not shown). The one or more motors may be controlled by a programmable controller (not shown) such that the extension positions of the first and second linear transfer members 134, 136, the routes taken along the collection and delivery strokes, and the speeds of the collection and delivery strokes are controllable automatically based on programmed instructions. A user may adjust the settings of the transfer arm 108 via a control panel (not shown). Thus, the wire transfer system 100 may operate automatically to separate individual wires 102 from the wire bundle 104, and the operation may be customized based on input information.

In an embodiment, during the collection stroke the transfer arm 108 moves the wire singulating device 106 towards the wire bundle 104 from the side. For example, from a starting position at which both the first and second linear transfer members 134, 136 are retracted, the second linear transfer member 136 extends downward along the vertical axis 191 until the wire singulating device 106 is at the same vertical height as the wire bundle 104. Then, the first linear transfer member 134 extends along the lateral axis 192 in a direction away from the stand 130 until the front edge 114 of the carrier member 112 engages the side 126 of the wire bundle 104. The transfer arm 108 thereafter moves the wire singulating device 106 upwards along the vertical axis 191 above the wire bundle 104 by retracting the second linear transfer member 136. As shown in FIG. 2, the wire singulating device 106 is located above the wire bundle 104. During at least one of the lateral movement of the wire singulating device 106 towards the wire bundle 104 or the subsequent vertical movement upwards, the wire 102 is received and/or collected in the slot 118 of the carrier member 112. In an alternative embodiment, during the collection stroke the transfer arm 108 may move the wire singulating device 106 towards and into engagement with the wire bundle 104 from above the wire bundle 104, instead of from the side. Then, the transfer arm 108 may pull the wire singulating device 106 upwards above the wire bundle 104, such that the wire singulating device 106 is basically dipped into the wire bundle 104 to collect one of the wires 102. During the delivery stroke, depending on the final delivery location, the first and second linear transfer members 134, 136 extend and/or retract to move the wire singulating device 106 away from the wire bundle 104 to separate the wire 102 from the other wires 102 in the wire bundle 104.

In an alternative embodiment, the wire bundle 104 is moved relative to the wire singulating device 106 instead of, or in addition to, the wire singulating device 106 being moved. For example, the bin 120 housing the wire bundle 104 may be controlled to be moved towards and relative to the wire singulating device 106 to deliver a wire 102 to the wire singulating device 106. The wire singulating device 106 may be stationary as the bin 120 moves. The bin 120 may be controlled to be moved away from the wire singulating device 106 after a wire 102 is received in the slot 118. Optionally, both the bin 120 and the wire singulating device 106 are moved during the repeatable singulating procedure.

Figure 3:
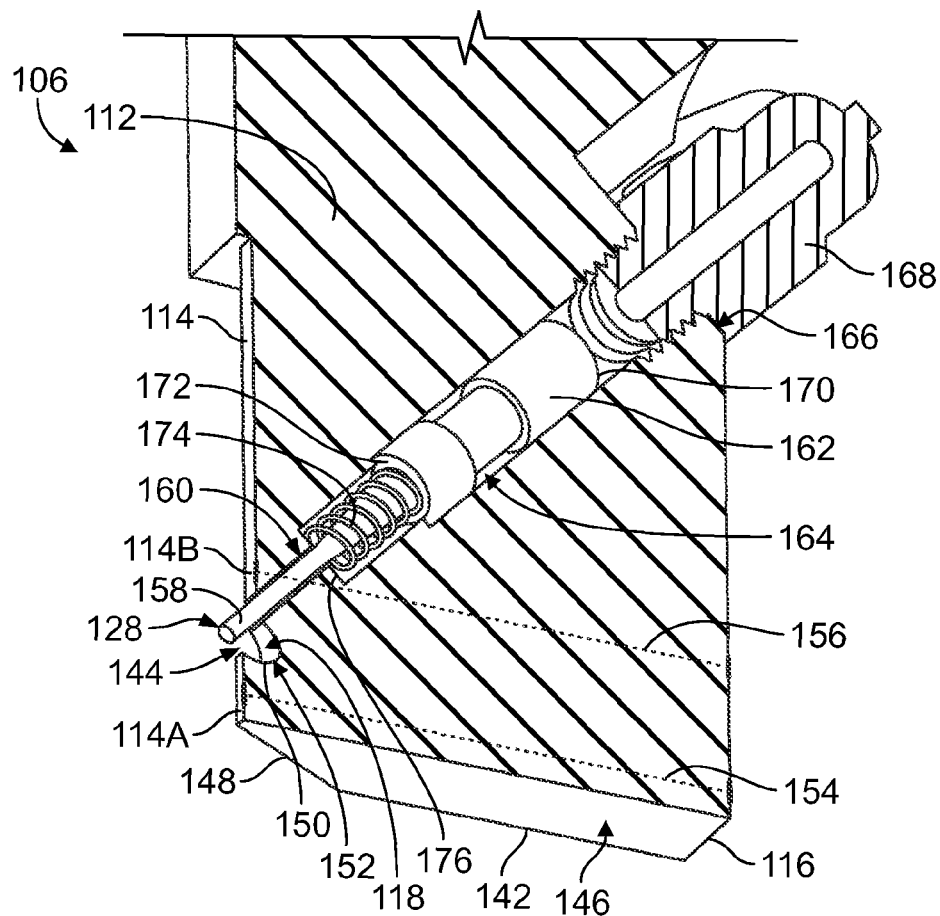
FIG. 3 is a perspective view of a lower portion of a wire singulating device of the wire transfer system according to an embodiment.

FIG. 3 is a perspective view of a lower portion of the wire singulating device 106 according to an embodiment. The wire singulating device 106 includes the carrier member 112 and the retention feature 128. The carrier member 112 is shown in cross-section in FIG. 3. The carrier member 112 includes a first side 140 (shown in FIG. 2 only) and an opposite second side 142 (shown in both FIGS. 2 and 3). The first side 140 is not shown in FIG. 3 because the cross-section extends between the first side 140 and the second side 142. The front edge 114 and the rear edge 116 of the carrier member 112 each extend between the first side 140 and the second side 142. The front edge 114 defines an opening 144 to the slot 118. The slot 118 extends through a thickness of the carrier member 112 between the first and second sides 140, 142. Thus, the slot 118 is open at the first and second sides 140, 142. The slot 118 accommodates wires 102 (shown in FIG. 1) that are longer than a thickness of the carrier member 112 because the wires 102 extend beyond the first side 140 and the second side 140.

In the illustrated embodiment, a bottom end 146 of the carrier member 112 is flat and planar. A front portion 148 of the carrier member 112 tapers to the front edge 114. Thus, the front edge 114 is narrower than the rear edge 116, and the front portion 148 forms a wedge. In the illustrated embodiment, the wire singulating device 106 is configured to engage the wire bundle 104 (shown in FIG. 1) from the side instead of from above. For example, the front portion 148 is tapered to reduce the amount of surface area of the front edge 114 that engages the wire bundle 104. In an alternative embodiment, such as the embodiment shown in FIG. 4, the bottom end 146 of the carrier member 112 is tapered and the wire singulating device 106 is configured to engage the wire bundle 104 from above.

In an embodiment, the slot 118 extends at least partially towards the bottom end 146 of the carrier member 112. The slot 118 thus may have both a rearward component and a downward component, which allows the wire 102 (shown in FIG. 1) received in the slot 118 to at least partially drop into a final resting position at a distal end 152 of the slot 118 relative to the opening 144. As described above, the slot 118 may be sized to accommodate only one wire 102 at a time. When one wire 102 is in the slot 118, that wire 102 may block other wires 102 of the wire bundle 104 (shown in FIG. 1) from entering the slot 118. A bottom wall 150 of the slot 118 is continuous with the front edge 114 of the carrier member 112 immediately below the opening 144. In an embodiment, the bottom wall 150 and the front edge 114 below the opening 144 form a hook that is configured to catch and direct the wire 102 of the wire bundle 104 into the slot 118 as the carrier member 112 moves relative to the wire bundle 104. The bottom wall 150 of the slot 118 may have a concave curve. The concave curve may encourage the wire 102 to be received fully within the slot 118 until the wire 102 engages the distal end 152 of the slot 118. In addition, the concave curve of the bottom wall 150 may provide a barrier that prohibits the wire 102 within the slot 118 from unintentionally falling out of the slot 118 through the opening 144.

In an embodiment, the front edge 114 of the carrier member 112 below the opening 144 protrudes further forward than the front edge 114 of the carrier member 112 above the opening 144 to the slot 118. For example, the front edge 114A immediately below the opening 144 is a first distance 154 from the rear edge 116, and the front edge 114B immediately above the opening 144 is a second distance 156 from the rear edge 116. The first distance 154 is greater than the second distance 156. Put another way, the front edge 114B above the opening 144 may be recessed relative to the front edge 114A below the opening 144. As a result, the opening 144 to the slot 118 extends at an angle relative to the front edge 114, and allows a wire 102 (shown in FIG. 1) that engages the front edge 114B above the opening 144 to at least partially drop into the slot 118 as the carrier member 112 moves upward relative to the wire bundle 104 (FIG. 1).

In an embodiment, the retention feature 128 is a retractable pin 158. The pin 158 is cylindrical in the illustrated embodiment, but may have other than a circular cross-section in other embodiments. The retractable pin 158 is movable between a retracted position and a deployed position. In the retracted position, the pin 158 does not interfere with access to the slot 118. For example, the pin 158 may be housed fully within the carrier member 112. Alternatively, the pin 158 may extend at least partially from the carrier member 112 at a sufficient distance from the opening 144 to avoid interference. In the deployed position, the pin 158 protrudes from the carrier member 112 and at least partially covers the opening 144 of the slot 118. In FIG. 3, the retractable pin 158 is shown in the deployed position. The pin 158 in the deployed position is configured to prevent a wire 102 (shown in FIG. 1) that is within the slot 118 from exiting the slot 118 through the opening 144. Optionally, the pin 158 may also be configured to repel other wires 102 of the wire bundle 104 (shown in FIG. 1) away from the carrier member 112. Thus, the pin 158 upon deploying may knock off clinging wires 102 from the carrier member 112. During operation, the pin 158 may be disposed in the retracted position as the transfer arm 108 (shown in FIG. 2) moves the wire singulating device 106 toward and into engagement with the wire bundle 104 to allow the wires 102 access to the slot 118 through the opening 144. Once a corresponding wire 102 is received in the slot 118, the pin 158 may be moved to the deployed position in order for the pin 158 to retain the wire 102 in the slot 118 as the wire singulating device 106 is moved away from the wire bundle 104 to singulate the wire 102. For example, the pin 158 may be deployed when the wire singulating device 106 is still in engagement with the wire bundle 104 or may be deployed after the wire singulating device 106 is lifted above or otherwise moved out of engagement with the wire bundle 104.

The retractable pin 158 may extend from the front edge 114 through a cavity 160 that is above the slot 118. Alternatively, the pin 158 may extend from a cavity below the slot 118 or may extend from the first side 140 (shown in FIG. 2), the second side 142, or the bottom end 146 instead of the front edge 114. In the illustrated embodiment, the retractable pin 158 is coupled to a cylindrical body 162 that is disposed within a cylindrical chamber 164. The pin 158 and the cylindrical body 162 may be integrally formed with each other or may be two discrete components joined together. The cylindrical chamber 164 is fluidly coupled to the cavity 160, such that the pin 158 extends through the cavity 160 into the chamber 164 to couple to the cylindrical body 162. Due to pressure within the chamber 164, the cylindrical body 162 moves back and forth within the chamber 164. The moving cylindrical body 162 propels the pin 158 back and forth within the cavity 160 between the deployed and retracted positions. The cylindrical body 162 may be moved by air pressure. For example, a rear end 166 of the chamber 164 may define an interface that couples to an air supply component 168 (shown in cross-section in FIG. 3), such as a tube or valve. The air supply component 168 is configured to selectively and intermittently supply air to the chamber 164 and release air from the chamber 164. The pressure of the air forces a rear surface 170 of the cylindrical body 162 towards the cavity 160. The pin 158 is coupled to a front surface 172 of the cylindrical body 162, so the pin 158 is propelled through the cavity 160 beyond the front edge 114 into the deployed position as the cylindrical body 162 moves toward the cavity 160.

In the illustrated embodiment, a compression spring 174 is disposed between a front wall 176 of the chamber 164 and the front surface 172 of the cylindrical body 162. When the air pressure forces the cylindrical body 162 towards the cavity 160 to move the pin 158 to the deployed position, the spring 174 compresses. Once the air pressure is reduced (for example, by letting air out of the chamber 164), the spring 174 may assert a biasing force that moves the cylindrical body 162 towards the rear end 166 of the chamber 164, which retracts the pin 158 to the retracted position. Thus, the pin 158 may be actuated between the retracted and deployed positions by controlling the air pressure in the chamber 164. Alternatively, instead of a compression spring 174, the air supply component 168 may produce a vacuum to pull the cylindrical body 162 towards the rear end 166 of the chamber 164 to retract the pin 158. In another alternative embodiment, a second air supply component may be coupled to the chamber 164 between the cavity 160 and the front surface 172. Thus, to deploy the pin 158, the first air supply component 168 supplies air that forces the rear surface 170 towards the cavity 160, and to retract the pin 158, the second air supply component supplies air that forces the front surface 172 towards the rear end 166 (while letting air out of the chamber 164 near the rear end 166). In other embodiments, instead of using air pressure, the pin 158 may be coupled to a stepper motor or the like that provides binary movement of the pin 158 between the deployed and retracted positions.

Figure 4:
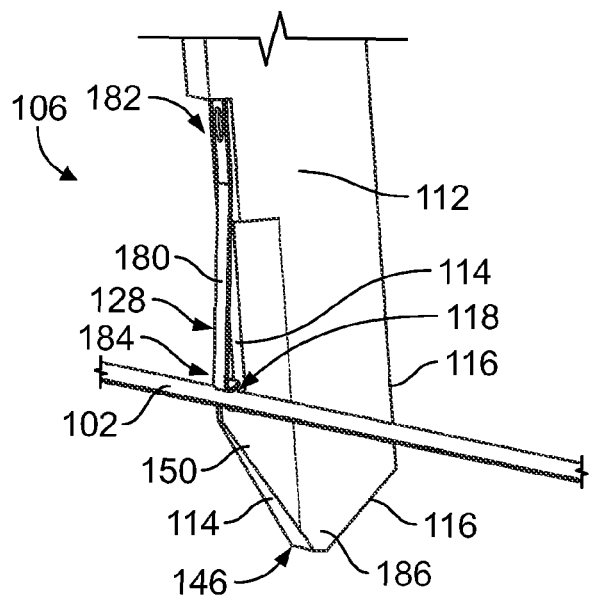
FIG. 4 is a perspective view of the lower portion of the wire singulating device according to an alternative embodiment.

FIG. 4 is a perspective view of the lower portion of the wire singulating device 106 according to an alternative embodiment. Instead of the retractable pin 158 shown in FIG. 3, the retention feature 128 is a leaf spring 180. The leaf spring 180 extends at least partially into the slot 118. For example, the leaf spring 180 is cantilevered to the carrier member 112. A fixed end 182 is fixed to the front edge 114 above the slot 118, and a free end 184 opposite the fixed end 182 extends into the slot 118 and engages the wire 102 in the slot 118. Optionally, the free end 184 may define a top end of the slot 118, such that the wire 102 is held between the bottom wall 150 of the slot 118 and the free end 184 of the leaf spring 180. The free end 184 may be curved away from the slot 118 to reduce the risk of damage from the leaf spring 180 scraping against the wire 102. In an embodiment, as the wire 102 enters the slot 118, the wire 102 engages the leaf spring 180 and deflects the leaf spring 180 inwards towards the front edge 114. When the wire 102 is fully seated within the slot 118, the leaf spring 180 exerts a biasing force on the wire 102 against the bottom wall 150. The interference between the leaf spring 180 and the bottom wall 150 retains the wire 102 in the slot 118. The wire 102 may be retained until a sufficient force exerted on the wire 102 and/or the leaf spring 180 causes the wire 102 to move relative to the leaf spring 180 and exit the slot 118. For example, the wire gripping device 132 (shown in FIG. 1) may exert such a force on the wire 102 to remove the wire 102 from the slot 118. In another alternative embodiment, the retention feature 128 may be a torsion spring instead of the leaf spring 180. Like the leaf spring 180, the torsion spring may be configured to apply a biasing force on the wire 102 against an inner wall of the slot 118 to retain the wire 102 within the slot 118. Optionally, the wire singulating device 106 may include more than one retention feature 128.

The carrier member 112 of the wire singulating device 106 shown in FIG. 4 includes a wedge section 186 at the bottom end 146. The front edge 114 of the carrier member 112 along the wedge section 186 is slanted and/or curved towards the rear edge 116. Optionally, as shown in FIG. 4, the rear edge 116 may also be slanted and/or curved along the wedge section 186 in a direction towards the front edge 114. Thus, the bottom end 146 is tapered. The wire singulating device 106 shown in FIG. 4 is configured to be lowered into the wire bundle 104 (shown in FIG. 1) from above such that the wedge section 186 engages and displaces wires 102 (shown in FIG. 1) of the wire bundle 104 during downward movement of the wire singulating device 106. For example, the wedge section 186 allows the carrier member 112 to penetrate the plurality of wires 102 instead of merely mashing a top of the wire bundle 104. By penetrating the wires 102, the positioning of the wires 102 relative to each other is agitated which may encourage the wires 102 to engage the front edge 114 of the carrier member 112 and be received in the slot 118.

In the embodiments shown in FIGS. 3 and 4, the carrier member 112 in each embodiment is an integral, one-piece plate. The slot 118 is formed in the plate, and the slot 118 has a fixed size. FIGS. 5-8 show alternative embodiments of the wire singulating device 106 that are configured to accommodate wires having different diameters.

Figure 5:
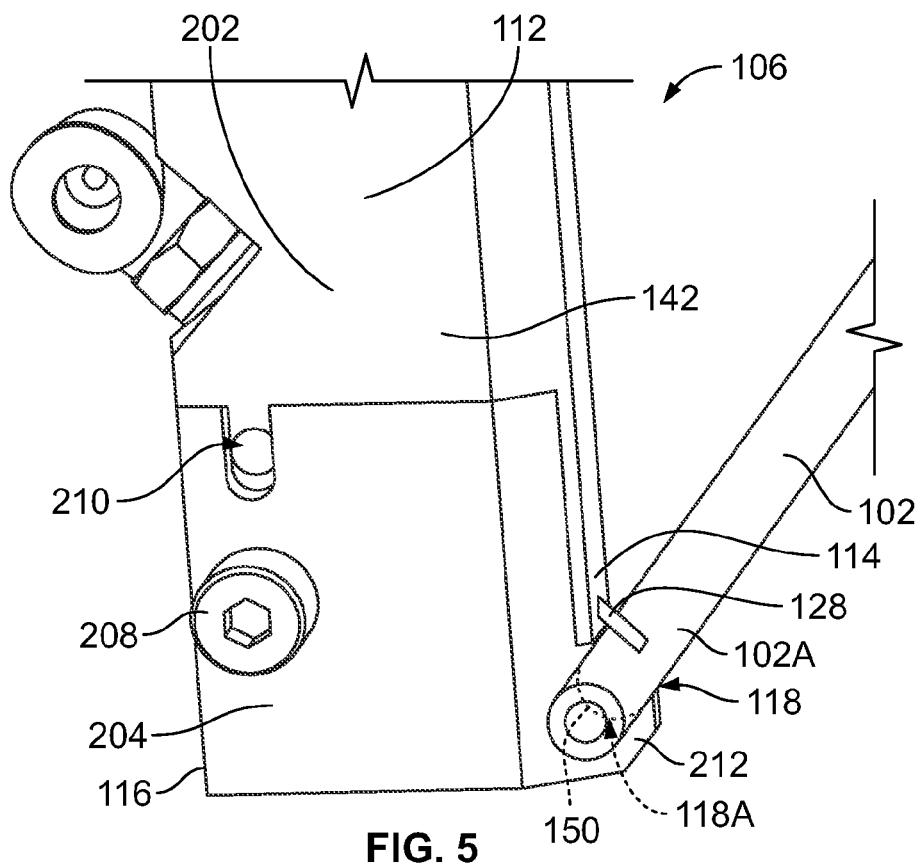
FIG. 5 is a perspective view of the wire singulating device according to an alternative embodiment.
Figure 6:
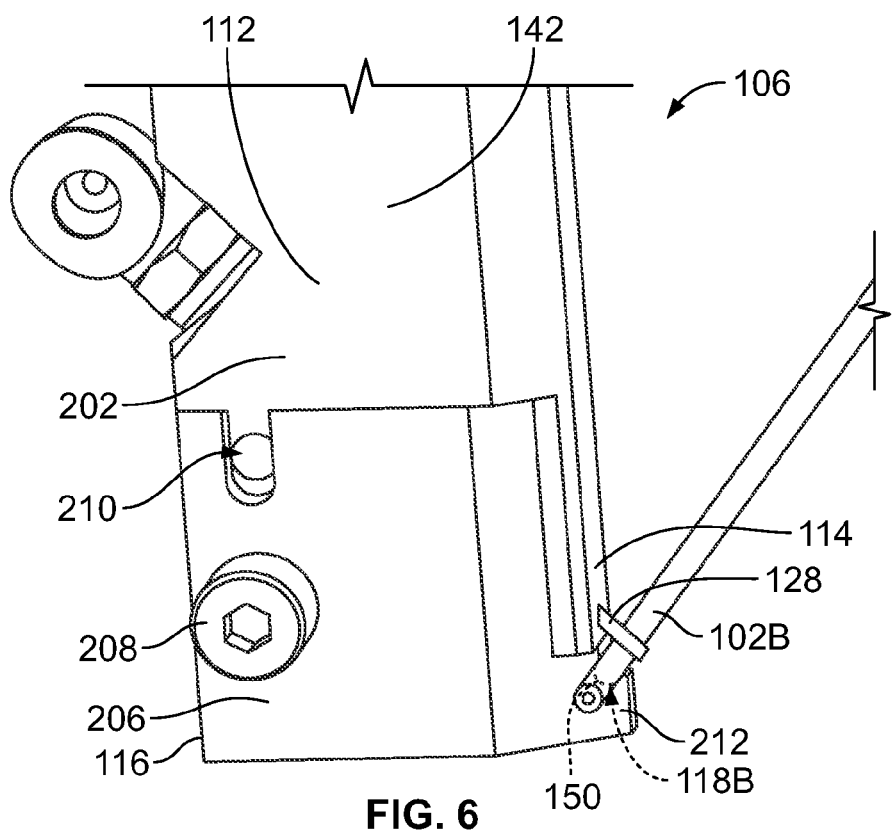
FIG. 6 is a perspective view of the wire singulating device of FIG. 5 having a substitute hook tooling.

FIG. 5 is a perspective view of the wire singulating device 106 according to an alternative embodiment. The carrier member 112 of the wire singulating device 106 includes a base 202 and a hook tooling 204. The hook tooling 204 is removably coupled to the base 202. The hook tooling 204 defines at least a portion of the slot 118. The base 202 is configured to accept substitution of the hook tooling 204 with a substitute hook tooling that defines at least a portion of a different slot that has a different size than the slot 118 defined by the hook tooling 204. The differently-sized slot is configured to receive and accommodate wires that have a different diameter than the wires that are received within the slot 118 of the hook tooling 204. For example, the hook tooling 204 shown in FIG. 5 may be a first hook tooling 204. FIG. 6 is a perspective view of the wire singulating device 106 of FIG. 5 having a substitute or second hook tooling 206 instead of the first hook tooling 204 shown in FIG. 5.

Referring to both FIG. 5 and FIG. 6, the first and second hook tooling 204, 206 are coupled to the second side 142 of the carrier member 112 via a bolt 208. Optionally, the hook tooling 204, 206 may also or alternatively extend along the first side 140 (shown in FIG. 2) of the carrier member 112. The bolt 208 is removable or at least releasable from a fixed position relative to the base 202 to allow the hook tooling 204, 206 to be removed and substituted. For example, the first and second hook tooling 204, 206 may have an identical or at least similar footprint in order to both couple the same way to the base 202. In addition to a hole (not shown) that receives the bolt 208, the base 202 also includes an aperture 210 configured to receive a locating pin (not shown), which fixed the orientation of the hook tooling 204, 206 relative to the base 202. In other embodiments, the hook tooling 204, 206 may be removably coupled to the base 202 via other coupling mechanisms other than a bolt, such as via a latch, a locking tab, or the like.

The first and second hook tooling 204, 206 shown in FIG. 5 and FIG. 6, respectively, each defines at least the bottom wall 150 (shown in phantom) of the respective slot 118. The first and second hook tooling 204, 206 each defines a hook segment 212 that extends further from the respective rear edge 116 of the carrier member 112 than a portion of the front edge 114 immediately above the slot 118. The retention feature 128 is coupled to the base 202, so the retention feature 128 is not changed or altered upon switching the hook tooling 204, 206. The slot 118A defined by the first hook tooling 204 shown in FIG. 5 has a larger size than the slot 118B defined by the second hook tooling 206 shown in FIG. 6. Although a corresponding wire 102 is shown loaded in both of the slots 118A, 118B in FIGS. 5 and 6, the outline of each parameter of the slots 118A, 118B is illustrated in phantom. Since the slot 118A is larger than the slot 118B, the first hook tooling 204 may be installed on the base 202 instead of the second hook tooling 206 when the wires 102 of the wire bundle 104 (FIG. 1) have a diameter that is too large to be received in the smaller slot 118B. For example, the wire 102A disposed in the slot 118A of the first hook tooling 204 has a larger diameter than the wire 102B disposed in the slot 118B of the second hook tooling 206. Although two hook tooling components 204, 206 are shown in FIGS. 5 and 6 that define two different sizes of slots 118, the wire singulating device 106 may include various other hook tooling components that have various sizes and/or shapes of slots. Thus, the base 202 may be configured to accept the various other hook tooling components in order for the wire singulating device 106 to accommodate and singulate different sizes and/or shapes of wire. The embodiments shown in FIGS. 5 and 6 having the retention feature 128 may be moved relative to the wire bundle 104 (shown in FIG. 1) and may employ the retention feature 128 in similar ways as the embodiment shown and described in FIGS. 2 and 3.

Figure 7:
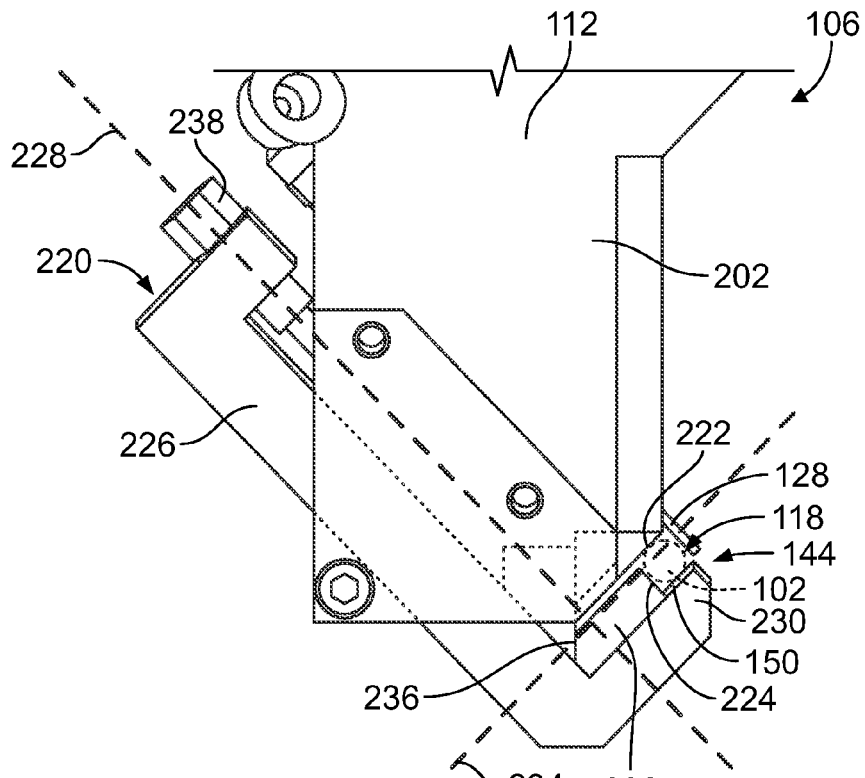
FIG. 7 is a side view of a lower portion of the wire singulating device according to an alternative embodiment.
Figure 8:
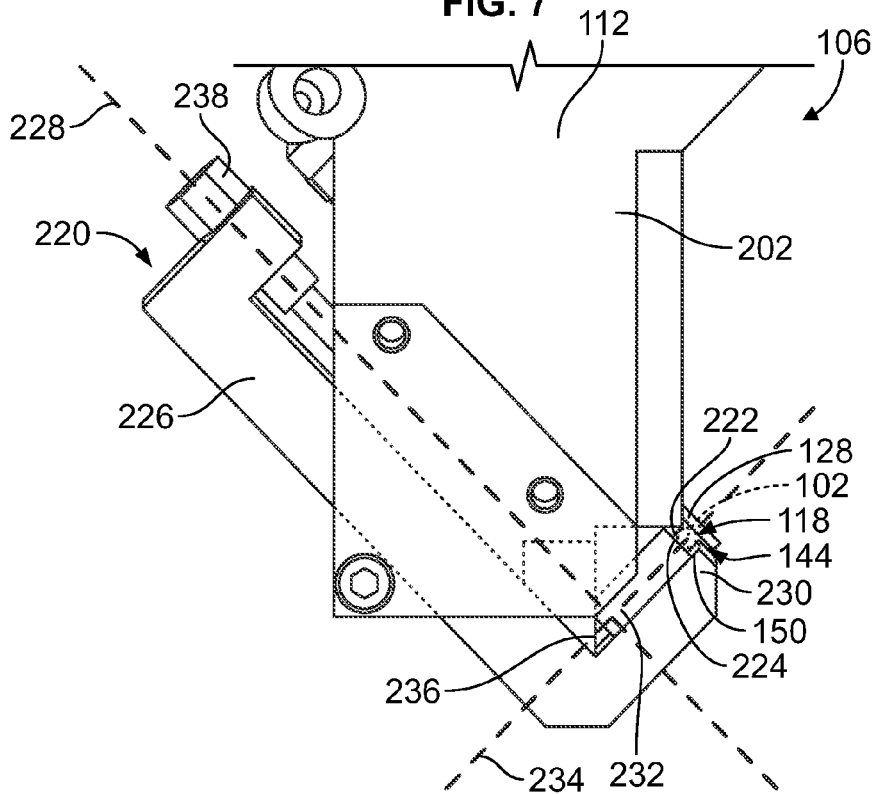
FIG. 8 is a side view of a lower portion the wire singulating device of FIG. 7 in which an adjustment mechanism is in a second position relative to a base.

FIG. 7 is a side view of a lower portion of the wire singulating device 106 according to an alternative embodiment. The carrier member 112 of the wire singulating device 106 includes a base 202 and an adjustment mechanism 220 coupled to the base 202. The adjustment mechanism 220 is movable relative to the base 202. In FIG. 7, the adjustment mechanism 220 is in a first position relative to the base 202. FIG. 8 is a side view of a lower portion the wire singulating device 106 shown in FIG. 7 in which the adjustment mechanism 220 is in a second position relative to the base 202. The adjustment mechanism 220 defines at least a portion of the slot 118. Upon moving the adjustment mechanism 220, the size of the slot 118 is adjusted in order to accommodate wires 102 that have different diameters. The following description refers to both FIG. 7 and FIG. 8.

In the illustrated embodiment, the base 202 defines a first portion of the slot 118. For example, the base 202 defines a top wall 222 of the slot 118. The adjustment mechanism 220 defines a second portion of the slot 118. The adjustment mechanism 220 may define the bottom wall 150 and also a distal wall 224 that opposes and faces the opening 144. The retention feature 128 is held by the base 202, so the retention feature 128 is not changed or altered upon adjusting the adjustment mechanism 220. In an embodiment, the adjustment mechanism 220 includes a hook jaw 226 that is configured to move along a first axis 228. A tip segment 230 of the hook jaw 226 defines the bottom wall 150 of the slot 118. Moving the hook jaw 226 along the first axis 228 such that the tip segment 230 moves away from the base 202 enlarges the size of the slot 118. Conversely, as the tip segment 230 of the hook jaw 226 is moved towards the base 202, the size of the slot 118 decreases. The embodiments shown in FIGS. 7 and 8 use the movement of the wire singulating devices 106 and the protruding tip segments 230 to usher one wire 102 at a time into the slot 118. The subsequent deployment of the retention feature 128 retains the wire 102 in the slot 118.

Optionally, the adjustment mechanism 220 further includes a bumper 232 that is held on the hook jaw 226. The bumper 232 is configured to float relative to the hook jaw 226 along a second axis 234. The term "float" is used to mean that the bumper 232 slides or otherwise moves relative to the hook jaw 226. The second axis 234 is oblique to the first axis 228. Optionally, the second axis 234 may be perpendicular to the first axis 228. For example, as the tip segment 230 of the hook jaw 226 is moved closer to the base 202, the bumper 232 on the hook jaw 226 moves with the hook jaw 226 along the first axis 228 but also moves relative to the hook jaw 226 along the second axis 234. In an embodiment, the bumper 232 engages a fixed wall 236 of the adjustment mechanism 220. As the hook jaw 226 moves, the bumper 232 is displaced along the second axis 234 by the fixed wall 236. The bumper 232 defines the distal wall 224 of the slot 118. As the tip segment 230 of the hook jaw 226 is moved closer to the base 202 to decrease the size of the slot 118, the bumper 232 moves along the second axis 234 closer to the opening 144 of the slot 118. Conversely, the bumper 232 moves along the second axis 234 away from the opening 144 when the tip segment 230 is adjusted farther from the base 202 to increase the size of the slot 118.

In the illustrated embodiment, the hook jaw 226 is configured to be adjusted manually by rotation of a bolt 238. The bolt 238 couples the adjustment mechanism 220 to the base 202 and allows the adjustment mechanism 220 to be fixed at different locations relative to the base 202. The bolt 238 may be calibrated for various specified wire diameters, such that an amount of rotation required to adjust the size of the slot 118 from accommodating a first wire diameter to accommodating a different, second wire diameter is predetermined. In other embodiments, the adjustment mechanism 220 is adjusted automatically using a motor, such as a servomotor, a stepper motor, or the like. The motor may be programmed (for example, connected to a programmable controller) to automatically adjust the adjustment mechanism 220 such that size of the slot 118 is modified to accommodate a selected wire diameter. The wire diameter may be selected by a user via a control panel.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A wire singulating device comprising:
a carrier member having a front edge and an opposite rear edge, the front edge defining an opening to a slot that extends at least partially towards the rear edge, the carrier member configured to be moved relative to a wire bundle that includes plural wires such that the front edge of the carrier member engages the wire bundle, the slot configured to receive one wire of the wire bundle therein; and
a retention feature coupled to the carrier member and juxtaposed relative to the slot to retain the wire within the slot as the carrier member is moved away from the wire bundle to separate the wire from the wire bundle, wherein the retention feature is a retractable pin that is moveable between a retracted position and a deployed position, the retractable pin in the deployed position protruding from the front edge a greater distance than when the retractable pin is in the retracted position and at least partially covering the opening of the slot to block access to the slot, the retractable pin in the retracted position allowing access to the slot for at least one of reception of the wire in the slot or removal of the wire from the slot.

2. The wire singulating device of claim 1, wherein the slot extends at least partially towards a bottom end of the carrier member, a bottom wall of the slot and the front edge of the carrier member immediately below the opening of the slot forming a hook that is configured to catch and direct the wire of the wire bundle into the slot as the carrier member moves relative to the wire bundle.

3. The wire singulating device of claim 1, wherein the slot is sized to accommodate only one wire of the wire bundle at a time, the wire in the slot blocking other wires of the wire bundle from entering the slot.

4. The wire singulating device of claim 1, wherein the carrier member is an integral, one-piece plate, the slot of the carrier member being formed in the plate and having a fixed size.

5. The wire singulating device of claim 1, wherein the carrier member includes a base and a hook tooling removably coupled to the base, the hook tooling defining at least a portion of the slot therein, wherein the base is configured to accept substitution of the hook tooling with a substitute hook tooling defining a different slot having a different size than the slot of the hook tooling to accommodate wires of a different diameter.

6. The wire singulating device of claim 1, wherein the carrier member includes a base and an adjustment mechanism coupled to the base, the base defining a first portion of the slot, the adjustment mechanism defining a second portion of the slot, the adjustment mechanism being moveable relative to the base to adjust a size of the slot to accommodate wires that have different diameters.

7. The wire singulating device of claim 6, wherein the adjustment mechanism includes a movable hook jaw that is configured to move along a first axis to adjust a size of the slot, the adjustment mechanism further including a bumper on the hook jaw that is configured to float relative to the hook jaw along a second axis that is oblique to the first axis as the hook jaw is moved.

8. The wire singulating device of claim 1, wherein the carrier member includes a wedge section at a bottom end below the slot, the front edge of the carrier member along the wedge section being at least one of slanted or curved towards the rear edge, wherein the carrier member is configured to be lowered into the wire bundle from above such that the wedge section engages and displaces wires of the wire bundle during downward movement of the carrier member.

9. The wire singulating device of claim 1, wherein the pin is configured to be in the retracted position as the carrier member moves toward the wire bundle to allow the slot to receive the corresponding wire of the wire bundle through the opening, the pin thereafter configured to be moved to the deployed position to retain the wire in the slot as the carrier member moves away from the wire bundle to separate the wire from the wire bundle.

10. The wire singulating device of claim 1, wherein the front edge of the carrier member immediately below the slot is a first distance from the rear edge and the front edge immediately above the slot is a second distance from the rear edge, the first distance being greater than the second distance, the slot configured to allow the wire to at least partially drop into the slot from above.

11. A wire singulating device comprising:
a carrier member having a front edge and an opposite rear edge, the front edge defining an opening to a slot that extends at least partially towards the rear edge, the carrier member configured to be moved relative to a wire bundle that includes plural wires such that the front edge of the carrier member engages the wire bundle, the slot configured to receive one wire of the wire bundle therein; and
a retention feature coupled to the carrier member and juxtaposed relative to the slot to retain the wire within the slot as the carrier member is moved away from the wire bundle to separate the wire from the wire bundle, wherein the retention feature includes at least one of a leaf spring or a torsion spring extending at least partially into the slot, the retention feature engaging the wire and applying a biasing force on the wire against an inner wall of the slot to retain the wire within the slot.

12. A wire transfer system comprising:
a bin holding a wire bundle that includes multiple wires in engagement with one another;
a wire singulating device including a carrier member that has a front edge and an opposite rear edge, the front edge defining an opening to a slot that extends at least partially towards the rear edge, the slot sized to receive only a single wire of the wire bundle therein; and
a transfer arm holding the wire singulating device and configured to move the wire singulating device towards and away from the bin, wherein, as the transfer arm moves toward the bin, the front edge of the carrier member engages the wire bundle and one of the wires of the wire bundle is received in the slot, the wire being retained in the slot as the transfer arm moves away from the bin to separate the wire from the wire bundle.

13. The wire transfer system of claim 12, wherein the transfer arm moves along a collection stroke and a delivery stroke, during the collection stroke the transfer arm moves the wire singulating device along a lateral axis towards the wire bundle until the front edge of the carrier member engages a side of the wire bundle, the transfer arm thereafter moving the wire singulating device along a vertical axis upwards above the wire bundle.

14. The wire transfer system of claim 12, wherein the transfer arm moves along a collection stroke and a delivery stroke, during the delivery stroke the transfer arm moves the wire singulating device having the wire therein away from the wire bundle to deliver the wire to at least one of a wire processing device, a wire gripping device, or a wire storage container.

15. The wire transfer system of claim 12, wherein the slot extends at least partially towards a bottom end of the carrier member, a bottom wall of the slot and the front edge of the carrier member immediately below the opening of the slot forming a hook that is configured to catch and direct the wire of the wire bundle into the slot as the transfer arm moves the wire singulating device relative to the wire bundle.

16. The wire transfer system of claim 12, wherein the wire singulating device further includes a retention feature coupled to the carrier member and juxtaposed relative to the slot to retain the wire within the slot as the transfer arm moves the wire singulating device away from the wire bundle to separate the wire from the wire bundle.

17. The wire transfer system of claim 16, wherein the retention feature is a retractable pin that is moveable between a retracted position and a deployed position, the pin in the deployed position protruding from the front edge a greater distance than when the retractable pin is in the retracted position and at least partially covering the opening of the slot to at least one of prevent the wire within the slot from exiting the slot through the opening or repel other wires of the wire bundle away from the carrier member.

18. The wire transfer system of claim 12, wherein the carrier member includes a base and an adjustment mechanism coupled to the base, the base defining a first portion of the slot, the adjustment mechanism defining a second portion of the slot, the adjustment mechanism being moveable relative to the base to adjust a size of the slot to accommodate wires that have different diameters.

19. The wire transfer system of claim 18, wherein the adjustment mechanism includes a movable hook jaw that is configured to move along a first axis to adjust a size of the slot, the adjustment mechanism further including a bumper on the hook jaw that is configured to float relative to the hook jaw along a second axis that is oblique to the first axis as the hook jaw is moved.

20. The wire transfer system of claim 12, wherein the carrier member includes a wedge section at a bottom end of the carrier member below the slot, the front edge of the carrier member along the wedge section being at least one of slanted or curved towards the rear edge, wherein, as the transfer arm moves toward the bin, the carrier member is lowered into the wire bundle from above the bin such that the wedge section engages and displaces wires of the wire bundle during downward movement of the carrier member.

* * * * *